United States Patent [19]

Fitzmartin

[11] Patent Number: 5,245,461
[45] Date of Patent: Sep. 14, 1993

[54] ANALOG OPTICAL FM RECEIVER

[75] Inventor: Daniel J. Fitzmartin, Newton, Mass.

[73] Assignee: The Charles Stark Draper Laboratory, Cambridge, Mass.

[21] Appl. No.: 641,530

[22] Filed: Jan. 15, 1991

[51] Int. Cl.⁵ .................. H04B 10/06; H04B 10/12
[52] U.S. Cl. .................................. 359/195; 359/189; 359/173; 250/227.12
[58] Field of Search ........ 359/189, 190, 191, 193–195, 359/182, 162, 140, 173; 329/302, 327, 336; 250/250.12; 385/24

[56] References Cited

U.S. PATENT DOCUMENTS

| 4,042,891 | 8/1977 | Levine | 331/175 |
| 4,629,994 | 12/1986 | Shimotashiro et al. | 329/327 |
| 4,697,926 | 10/1987 | Youngquist et al. | 250/227.12 |
| 4,783,852 | 11/1988 | Auracher | 359/190 |
| 4,984,297 | 1/1991 | Manome | 359/191 |
| 5,181,136 | 1/1993 | Kavehrad et al. | 359/190 |

Primary Examiner—Richard E. Chilcot, Jr.
Assistant Examiner—Kinfe-Michael Negash
Attorney, Agent, or Firm—Iandiorio & Dingman

[57] ABSTRACT

An analog Optical FM Receiver which includes an optical delay for shifting the phase of a received modulated optical carrier signal as a function of the modulating analog signal so that the phase variation between the shifted optical signal and the received frequency modulated carrier signal can be determined and the modulating analog signal can be extracted.

10 Claims, 7 Drawing Sheets

ANALOG OPTICAL FM RECEIVER

FIELD OF INVENTION

This invention relates to an analog optical FM communications system.

BACKGROUND OF INVENTION

Optical communications systems are coming into more and more widespread use because of the low transmission loss and low cost of optical fibers, and the extremely wide communications bandwidth afforded by them. Digital optical communications are widely used but analog techniques are still relatively undeveloped.

Optical analog intensity modulation operates by varying the intensity of a laser output in response to the analog modulating signal.

Until recently, analog signals were transmitted over an optical channel either by intensity modulation of the optical output of a diode laser or by using an A/D converter to convert the analog signal, sending the result as digital data over the optical channel, and reconverting the received digital data to an analog signal using a D/A converter. Intensity modulation is selected for analog signal communication whenever either or both the A/D dynamic range (number of bits) and/or the sampling rate are insufficient to provide the desired communication performance. The two means for generating an intensity modulated optical signal are direct modulation of the injection current of a diode laser and the use of an external integrated optics Mach-Zender interferometer.

During the last several years a technique known as subcarrier FM has been introduced. In this scheme the analog signal to be transmitted is used to modulate an electronic voltage controlled oscillator (VCO). The VCO output, with constant amplitude and varying frequency, is converted to a square wave using a limiter. The resulting digital signal is transmitted over a digital fiber communications system. The detected electronic digital signal is then demodulated using a discriminator to yield the original analog signal.

The dynamic range of a communication system is determined by the system noise floor for small signals, and by the saturation level for large signals. In an amplitude (intensity) modulated system, the modulation/demodulation process does not provide any reduction of the noise introduced by the system components. The linearity of an AM system is determined primarily by the linearity of the device generating the modulation. In the case of both injection current modulation of the intensity of a diode laser optical output, or external modulation of the optical output of any type laser using a Mach-Zender interferometer, linearity is inherently limited by the modulator characteristics. The dynamic range of an AM system is thus limited by the noise produced by the components in the system and the linearity of the system components. The subcarrier FM system is limited by the modulation bandwidth of the VCO, typically less than 20 MHz, and the VCO modulation linearity.

Optical FM discriminators have been made using Fabry-Perot interferometers but their noise performance makes them unsuited for FM demodulation. Delay line discriminators are also known but these use very long differential delays (many tens of microseconds) for measuring laser linewidth or frequency noise.

SUMMARY OF INVENTION

It is therefore an object of this invention to provide an improved analog optical communications system.

It is a further object of this invention to provide such an analog optical communications system with reduced noise signals.

It is a further object of this invention to provide such an analog optical communications system which has higher linearity.

It is a further object of this invention to provide such an analog signal communications systems which makes more efficient use of the available bandwidth and enables use of frequency division multiplex for multichannel operation.

It is a further object of this invention to provide an analog optical frequency modulation system.

It is a further object of this invention to provide an analog optical frequency modulation transmitter and a receiver.

This invention results from the realization that a practical analog optical FM system can be effected by using a high linearity analog optical FM transmitter and using an analog optical FM receiver which compares the delayed and undelayed signals to obtain the phase difference between them representative of the modulating analog signal.

This invention features an analog optical communications system as well as an individual analog optical FM transmitter and receiver. The analog optical FM receiver according to the invention includes an optical delay for shifting the phase of a modulated optical carrier signal as a function of the modulating signal and means for comparing the phase shifted modulated optical carrier signal with a reference signal to obtain the variation in phase representative of the modulating signal. In a preferred embodiment the reference signal is the unshifted or undelayed modulated optical carrier signal. The means for comparing may include a local oscillator laser for providing a reference signal which is synchronized in frequency with the unmodulated optical carrier signal. The optical delay may include a length of fiber optic element.

The means for comparing may include a local oscillator laser for providing a local oscillator optical signal whose frequency differs from that of the unmodulated optical carrier signal. There are means for beating the local oscillator optical signal with the delayed modulated optical carrier signal to obtain a delayed modulated intermediate signal, and with the undelayed modulated optical carrier signal to obtain an undelayed modulated intermediate signal. The delayed and undelayed modulated intermediate signals are combined to detect the variation in phase representative of the modulating signal. The intermediate signals may be electrical signals, and there may be means for limiting the amplitudes and variations in the intermediate signals.

The invention also features an analog optical FM receiver which has means for beating a modulated optical carrier signal with an optical reference signal to obtain a modulated intermediate signal, and a local oscillator for providing the optical reference signal whose frequency differs from that of the unmodulated optical carrier signal. A delay discriminator delays the modulated intermediate signal and combines the delayed modulated intermediate signal with the undelayed modulated intermediate signal to detect the variation in phase representative of the modulating signal. In a preferred construction the intermediate signal is an electrical signal and there are means for limiting the amplitude and variations in the intermediate signal in order to control the noise.

The invention also features an analog optical FM receiver utilizing an optical delay for shifting the phase of a modulated optical carrier signal as a function of the modulating signal and means for comparing the phase shifted modulated optical carrier signal with the unshifted modulated optical carrier signal to obtain the variation in phase representative of the modulated signal.

An analog optical FM receiver is also featured which uses an optical delay for shifting the phase of a modulated optical carrier signal as a function of the modulating signal in conjunction with a local oscillator laser for providing a local optical carrier signal which is synchronized in phase and frequency with the unmodulated optical carrier signal. The phase shifted modulated carrier signal is compared with the local optical carrier signal to obtain the variation in phase representative of the modulating signal.

The invention also features an analog optical FM transmitter which includes a diode laser and means for applying modulating analog signal to vary the injection current of the laser to produce an FM modulated optical signal whose optical frequency varies as a function of the modulating analog signal.

DISCLOSURE OF PREFERRED EMBODIMENT

Other objects, features and advantages will occur to those skilled in the art from the following description of a preferred embodiment and the accompanying drawings, in which.

Figure 8:
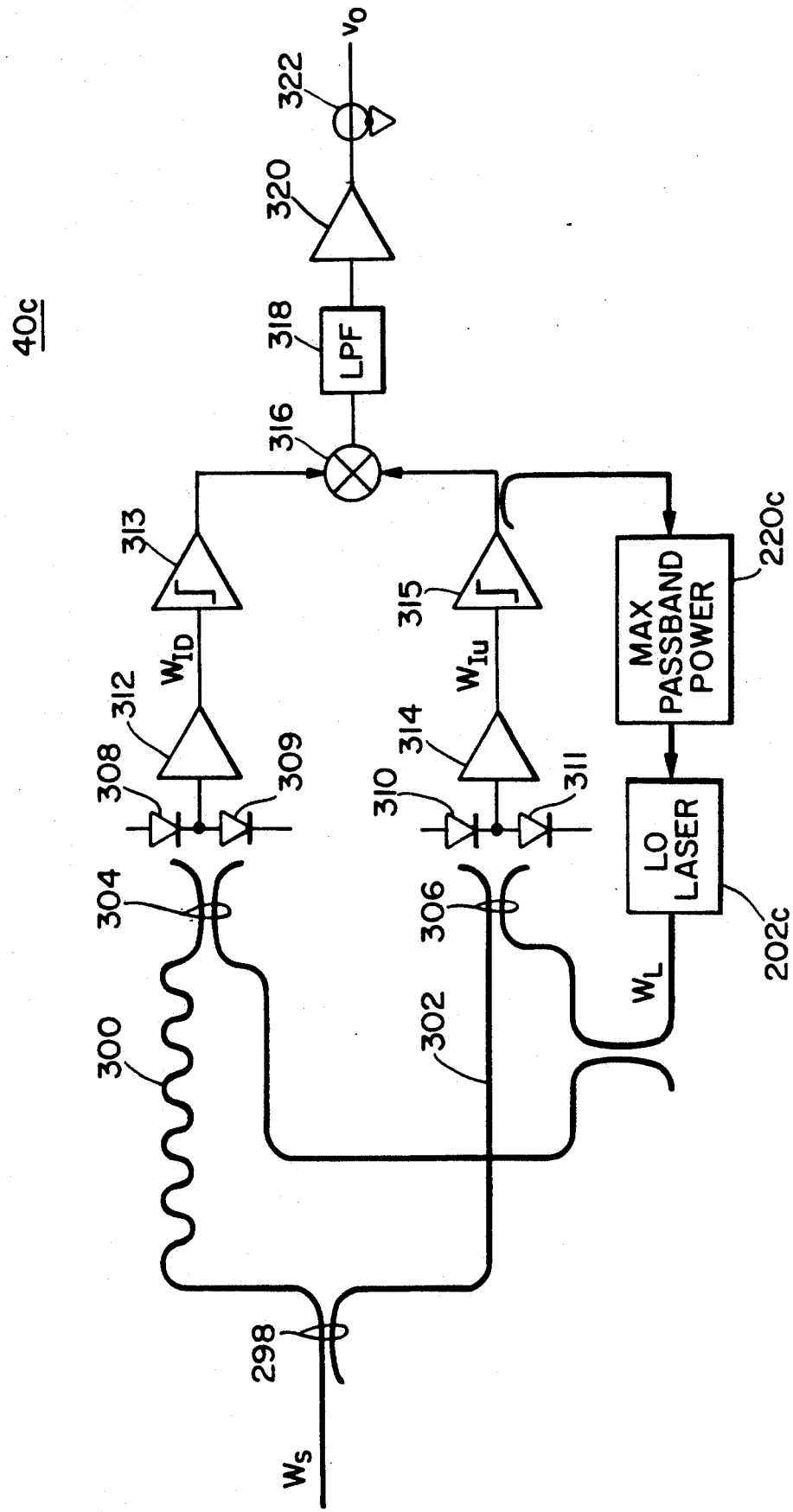
Figure 9:
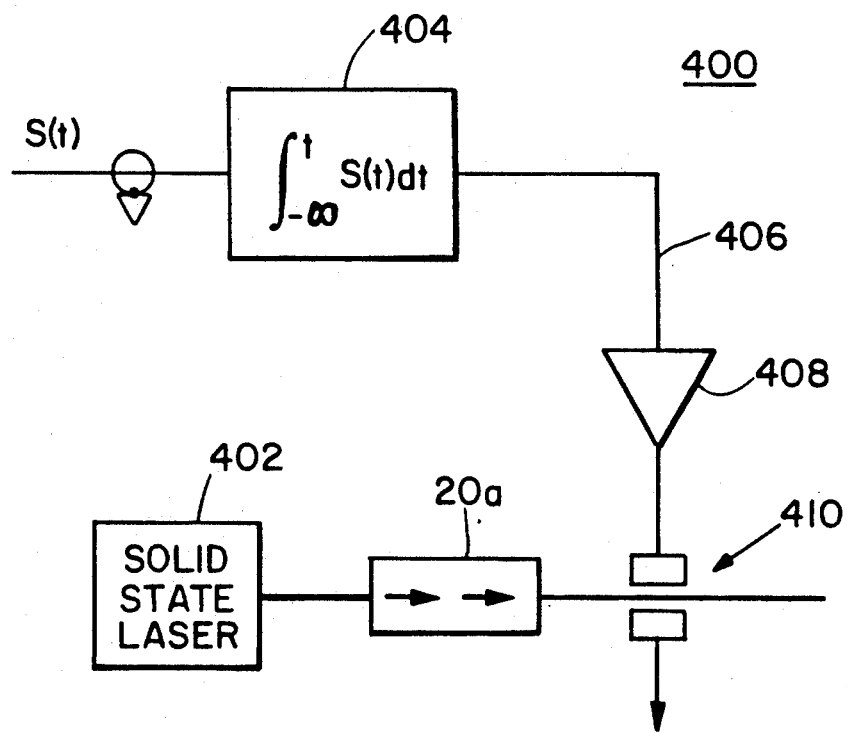

FIG. 8 is a schematic block diagram of an analog optical FM receiver employing a local laser oscillator to obtain mixing in the optical stage preliminary to the IF stage; and FIG. 9 is a schematic block diagram of an alternative analog optical FM transmitter using an electronic signal representing the phase variations that correspond to the desired frequency variations to drive an integrated optics phase modulator to effect FM modulation of a laser beam.

Figure 1:
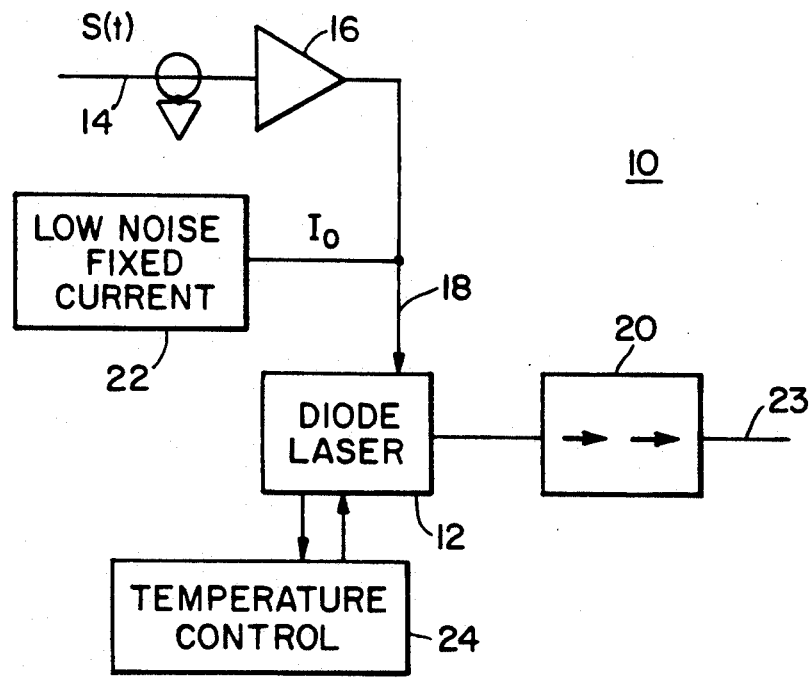
FIG. 1 is a schematic block diagram of an analog optical FM transmitter according to this invention.

There is shown in FIG. 1 an analog optical FM transmitter 10 according to this invention including a diode laser 12 whose frequency output is varied in accordance with the modulating analog signal S(t) on line 14, which is amplified by amplifier 16 and delivered directly on line 18 as an injection current to diode laser 12. The optical output of diode laser 12 is directed through an optical isolator 20, after which the laser light is directed through space or through a fiber optic element 23 to the remote receiver. A low noise fixed current source 22 such as a battery is used to provide the d.c. bias to diode laser 12 in order to avoid any fluctuations in the amplitude of the current which would result in fluctuations in the frequency of the emitted laser light. Similarly, a temperature control circuit 24 is employed to reduce the laser frequency fluctuations due to temperature fluctuations.

Figure 2:
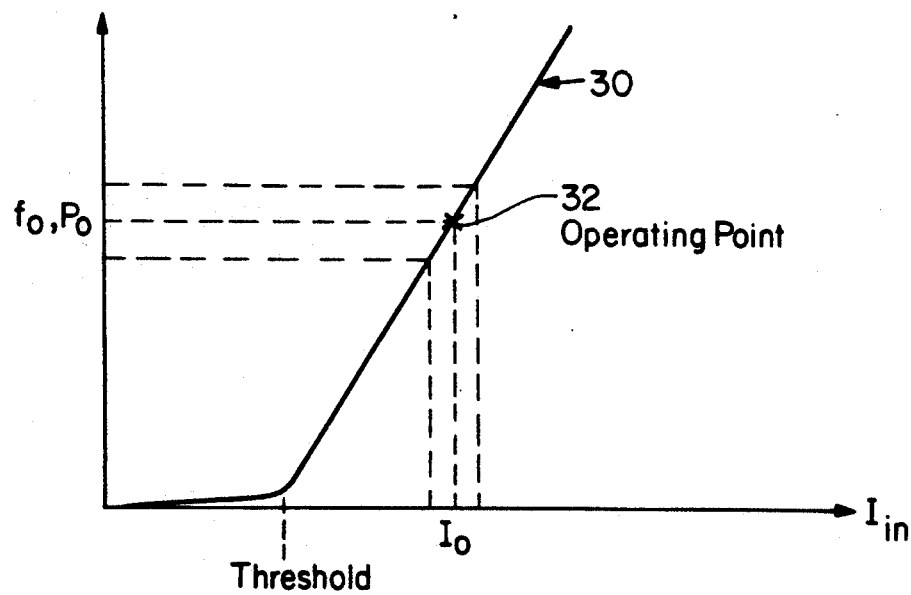
FIG. 2 is an illustration of a characteristic curve showing the variation in frequency with variations in injection current for a laser diode.

A typical laser operating characteristic 30 is shown in FIG. 2, where the operating point 32 fixed by current $I_o$ from the low noise fixed current source 32 in FIG. 1, sets an operating point of $P_o$ and $f_o$, where $f_o$ is the frequency of the laser light output and $P_0$ is the operating optical output power or intensity of the laser 12 when there is no modulation present.

Characteristic 30, FIG. 2, illustrates an important feature of the laser transmitter: variations in the current to the laser result in variation of the frequency of the optical output of the laser, which facilitates the modulation of the diode laser as shown in FIG. 1. The same attribute makes the diode susceptible to noise because any inadvertent or accidental variation in the injection current will cause a shift in the frequency. As can also be seen in FIG. 2, the power output of the laser will vary in response to variations in the injection current $I_o$.

Figure 3:
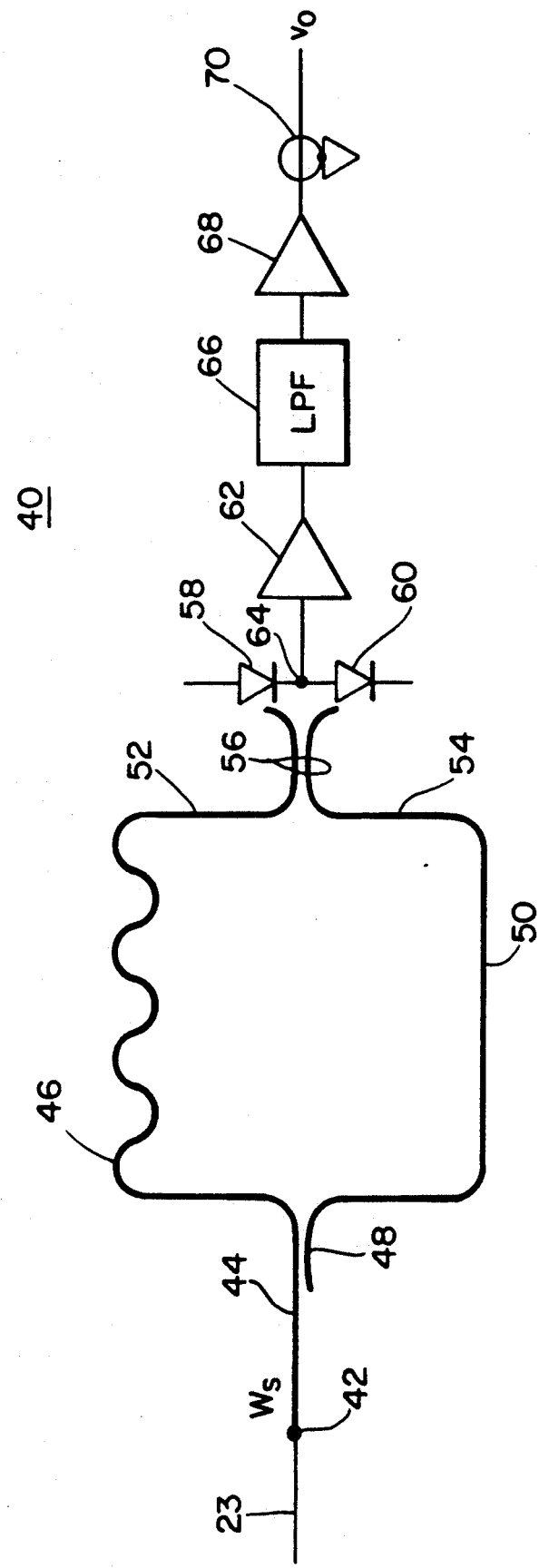
FIG. 3 is a schematic block diagram of an analog optical FM receiver according to this invention.

Receiver 40, FIG. 3, according to this invention includes an input terminal 42 at which the modulated optical carrier signal $W_S$ from transmitter 10 is received. The analog modulated carrier signal $W_S$ received at terminal 42 is transmitted along fiber optic element 44 to fiber optic delay line 46. It is also coupled by means of a fiber optic directional coupler 48 to a straight piece fiber optic element 50. Fiber optic delay line 46 is constructed to have a length to introduce a specific delay to the modulated carrier signal at its output 52. For example, a length of 1 meter provides a delay of 5 nanoseconds. The output from fiber optic element 50 at output 54 is simply the unshifted or undelayed modulated carrier signal. When the delayed and undelayed modulated carrier signals are combined in directional coupler 56 and delivered to photodiodes 58 and 60, the resulting signal provided to amplifier 62 represents the difference in phase between the delayed and the undelayed modulated carrier signals. Since the delay introduced by fiber optic delay element 46 has been chosen so that the output to amplifier 62 is zero or some known value when there is no modulation, any variation from that value is proportional to the frequency modulation of the carrier. Thus the signal on junction 64 is the phase difference between the delayed and undelayed carrier signals which represents the modulating signal which frequency modulated the carrier $W_S$. From amplifier 62, the modulating signal is passed through low pass filter 66 which blocks all but the band containing the modulating signal. After further amplification in amplifier 68, the detected modulating signal, S(t), or message, is provided at output terminal 70. This is the same signal as appears at 14 in FIG. 1.

Figure 4:
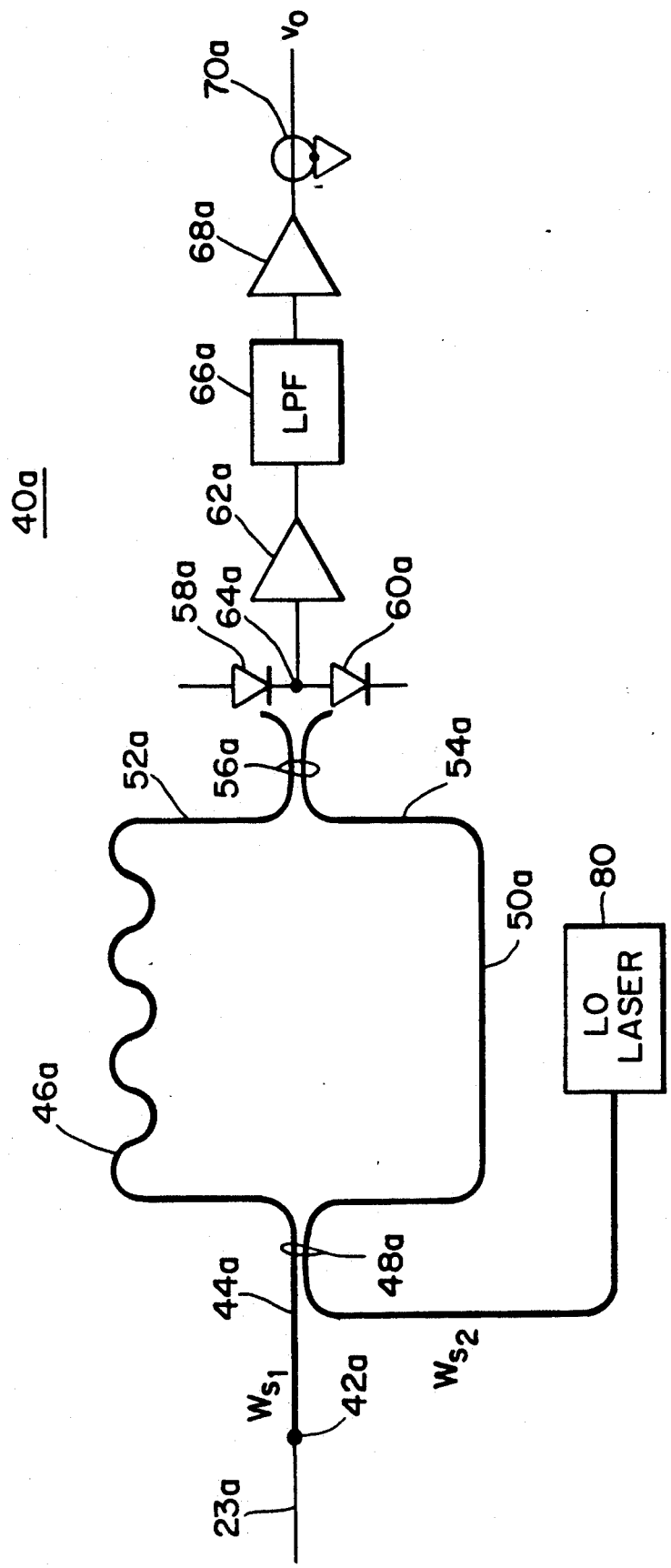
FIG. 4 is a schematic block diagram of an alternative analog optical FM receiver according to this invention using a local laser oscillator to improve receiver sensitivity.

The strength of the signal provided at junction 64a can be improved using a local oscillator laser 80, FIG. 4, which provides a second reference signal $W_{S2}$ in fiber optic element 50a. This optical signal is synchronized in frequency and phase with the incoming unmodulated carrier $W_{S1}$. The output from directional coupler 56a is a combination of the carrier signal from optical delay line 46a and optical fiber element 50a. A signal of increased power on optical element 50a boosts the total signal level at coupler 56a and thus increases the available signal at junction 64a and the overall gain of the system. By virtue of the operation of the directional couplers 48 and 56 a portion of the light signal $W_{S1}$ crosses over into fiber optic element 50a and crosses over into fiber optic delay line 46a.

Figure 5:
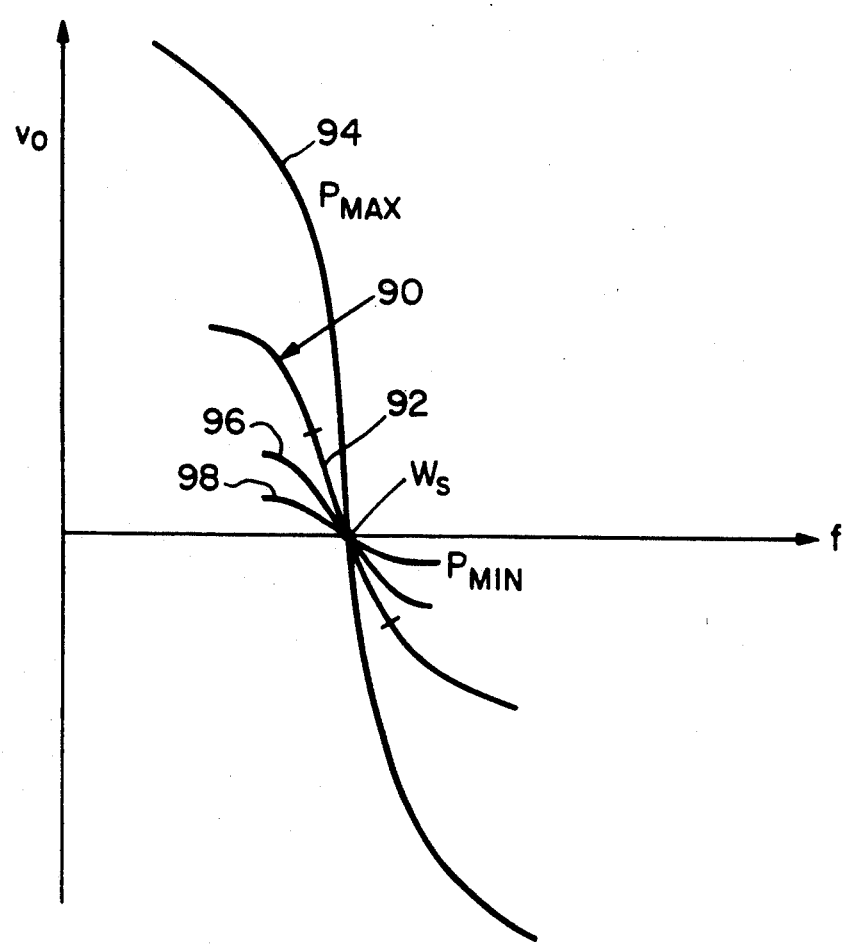
FIG. 5 is an illustration of a characteristic curve showing the variation in the output voltage in response to frequency variations in a receiver according to this invention.

The output voltage S(t) at terminal 70 varies in accordance with the variation of the frequency of the modulating signal which modulates the carrier as indicated by the cosinusoidal delay line discriminator characteristic 90, FIG. 5. Thus it can be seen as the frequency f of the modulated signal varies along the abscissa, the output voltage S(t) at terminal 70 varies in proportion. Normally the system is operated in the linearmost region 92 of the characteristic. However, a problem occurs when the power applied to the laser varies because the characteristic 90 shifts about the carrier frequency $W_S$ as a function of the applied power so that the system operates according to various other characteristics 94, 96, 98. Thus when the power shifts, the voltage amplitude produced by a particular modulation frequency will change.

Figure 7:
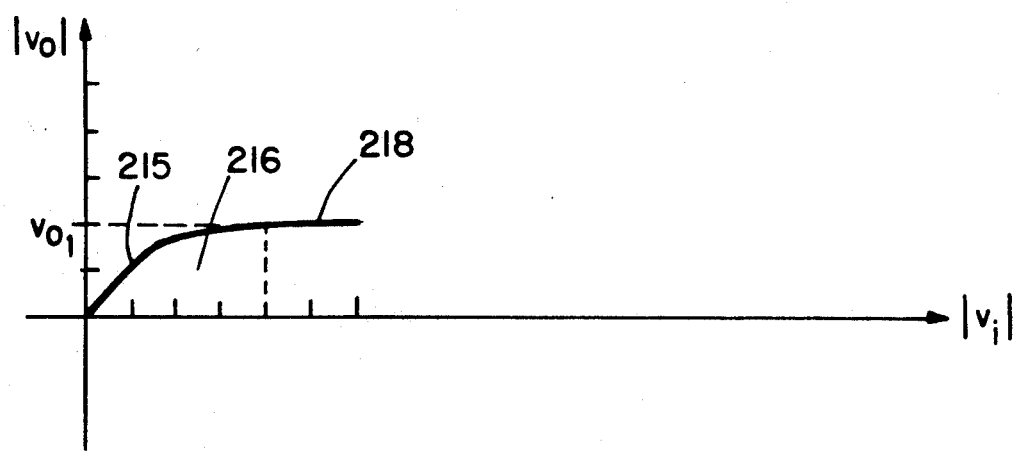
FIG. 7 is an illustration of a characteristic curve showing the response of the limiter shown in FIG. 6.
Figure 6:
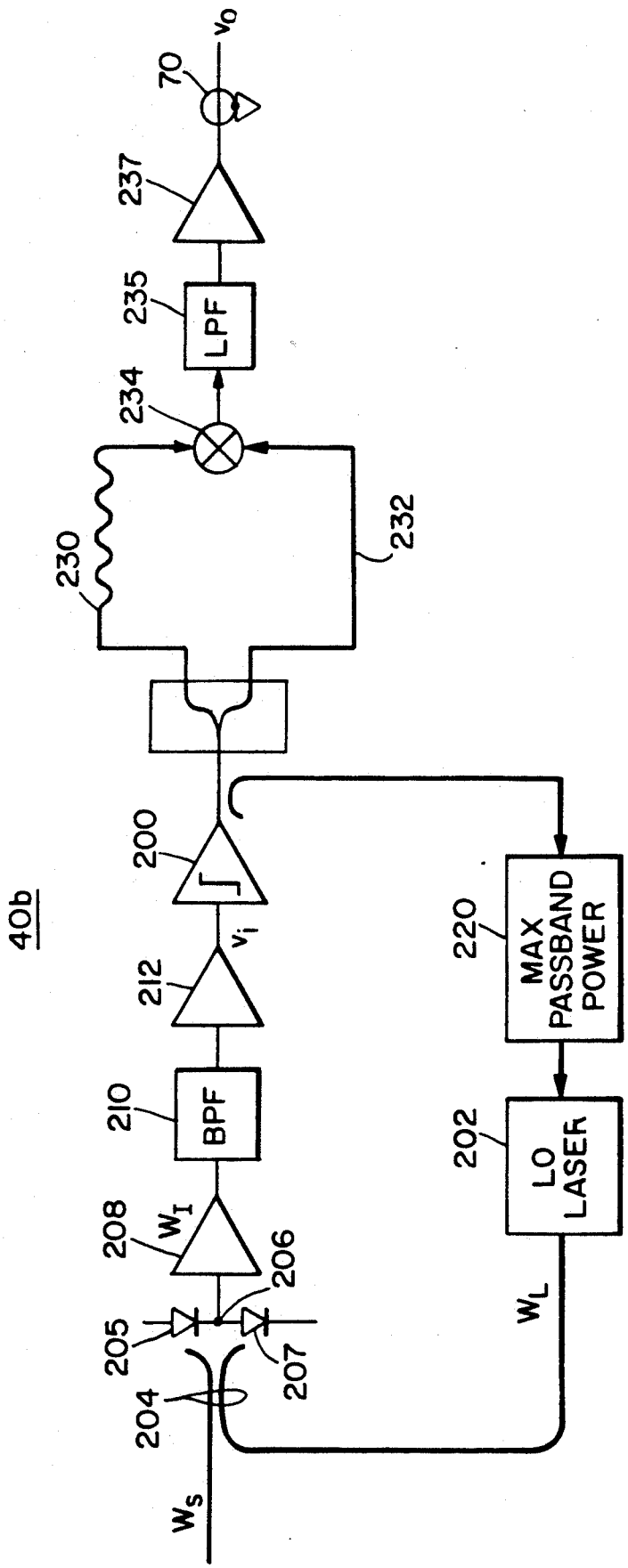
FIG. 6 is a schematic block diagram of an alternative analog optical FM receiver according to this invention using a local laser oscillator to obtain an IF signal and using a limiter in the IF section to suppress all variations in optical signal and optical local oscillator intensity, including intensity noise.

The problem depicted in FIG. 5 can be eliminated with the system in FIG. 6 with the addition of a limiting or saturating amplifier 200. In the circuit of FIG. 6, the local oscillator laser 202 provides a frequency $W_L$, which differs from the unmodulated carrier frequency $W_S$. These two optical signals are beat together in photoelectric diodes 205, 207 which provides a modulated intermediate frequency (IF)$W_I$ at junction 206 of the photoelectric diodes 205, 207. This intermediate frequency $W_I$ from the output of amplifier 208 propagates through bandpass filter 210 and amplifier 212 to limiter 200. Above a certain level, limiter amplifier 200 saturates and no matter how great the input, the output remains the same. This is demonstrated in FIG. 7, where initially the transfer characteristic 215 of limiter amplifier 200 is a smooth ramp up to the point 216 where the amplifier saturates after which the characteristic maintains a level plane 218. Thus regardless of how high $v_i$ goes at the input of amplifier 200, the output will never go over the level $v_{o1}$, FIG. 7. Therefore, once the saturation level is reached the system is operating at a particular characteristic 90, FIG. 5, and that characteristic is no longer subject to change, thereby eliminating that source of error. But limiter 200 performs two other functions as well. First, once it reaches its saturation or limit level it suppresses any amplitude noise introduced into the laser sources in the transmitter and receiver, and second it acts as an AGC in that it allows the output amplitude to increase only up to a point and after that prevents further increase even though the input signal may become much stronger. The maximum passband power circuit 220 in FIG. 6 uses a feedback loop to maintain $W_I$, which is the difference between $W_S$ and $W_L$, even though $W_S$ may vary somewhat.

From the output of limiter amplifier 200, the signal splits into electrical delay line 230 and undelayed line 232. The two $I_F$ signals, delayed and undelayed, are compared in mixer 234 to obtain any phase difference. This phase difference represents the modulating signal. A low pass filter 235, such as an audio filter if the message is in the audio range, filters out all but the message, which is then amplified in amplifier 237 and provided on terminal 70. The modulating message is certainly not restricted to audio information as energy in any other spectrum band, e.g., r.f, microwave may be accommodated.

If wideband FM modulation is desirable, then electronic delay line 230 in FIG. 6 must be relatively short. Since the delay line discriminator characteristic, FIG. 5, was derived from the expression $\cos 2\pi f \Delta T = 0$, where f is the frequency and $\Delta T$ is the delay, it can be seen that shortening the delay line 230 to obtain a wider bandwidth requires an increase in the IF frequency. But there are technological upper limits on this frequency: beyond the upper microwave ranges there are no suitable components such as the bandpass filter and amplifiers and limiters shown in FIG. 6. Therefore if wide band FM modulation is desirable, the circuit of FIG. 8 is used. In FIG. 8, the modulated carrier signal $W_S$ is delivered by coupler 298 to optical delay line 300 and straight line 302. The delayed and undelayed modulated carriers are combined with the local oscillator signal $W_L$ at directional couplers 304 and 306, respectively. These signals are beat together and detected by their respective photoelectric diode pairs 308, 309 and 310, 311 so that amplifier 312 produces modulated intermediate frequency $W_{ID}$ which has been delayed, and amplifier 314 provides the modulated undelayed intermediate signal $E_{IU}$. Each of the signals passes through limiters 313, 315 and are then combined in mixer 316. At this point any difference in phase between the two signals is detected, and this difference in phase represents the fluctuations in the frequency of the modulated carrier. The resulting signal is the modulating signal or message, which is then passed by low pass filter 318, amplified in amplifier 320 and delivered to the output terminal 322.

An alternative transmitter 10a is shown in FIG. 9 and is described in further detail in a copending application filed on even date herewith entitled "Optical FM Modulation System" by Fitzmartin et al. Transmitter 400, FIG. 9, does not directly drive or modulate the laser 402. Rather, the analog modulating signal S(t) is integrated in integrator 404 to produce a signal on line 406 to amplifier 408, representing the phase variations that correspond to frequency variations that occur when the laser output is frequency modulated by S(t). The output of amplifier 408 representing the phase is used to drive integrated optics phase modulator 410, which will vary the phase of the laser passing through it. Since varying the phase also results in varying the frequency, an FM modulation is accomplished.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An analog optical FM receiver comprising:
   means for receiving an optical carrier signal modulated by an analog signal;
   an optical delay for shifting the phase of the modulated optical carrier signal as a function of the analog modulating signal;

means for combining the phase shifted optical carrier signal with an optical reference signal;

means, responsive to said means for combining, for determining the variation of phase between the phase shifted optical carrier signal and the reference signal; and means, responsive to said means for determining, for extracting the analog signal from the modulated optical carrier signal.

2. The analog optical FM receiver of claim 1 in which said reference signal is the received unshifted modulated optical carrier signal.

3. The analog optical FM receiver of claim 1 further including a local oscillator laser for providing said reference signal, said reference signal synchronized in phase and frequency with the unmodulated optical carrier signal.

4. The analog optical FM receiver of claim 1 in which said optical delay includes a length of fiber optic element.

5. The analog optical FM receiver of claim 1 in which said means for determining the variation of phase between the phase shifted optical carrier signal and the reference signal includes photodiode means responsive to the combined phase shifted optical carrier signal and the optical reference signal.

6. An analog optical FM receiver comprising:
an optical delay for shifting the phase of the modulated optical carrier signal as a function of the modulating signal;
a local oscillator laser for providing a local optical signal which is synchronized in phase and frequency with the unmodulated optical carrier signal; and
means for determining the difference in phase between the phase shifted modulated optical carrier signal and said local optical signal to obtain the variation in phase representative of the modulating signal.

7. An analog optical FM receiver comprising:
means for receiving an optical carrier signal modulated by an analog signal;
a local oscillator for providing a local oscillator signal whose frequency differs from that of the unmodulated optical carrier signal;
an optical delay for shifting the phase of the modulated optical carrier signal as a function of the analog modulating signal;
means for beating the local oscillator optical signal with the phase shifted modulated optical carrier signal to obtain a delayed modulated intermediate signal, and for beating the local oscillator optical signal with the received modulated optical carrier signal to obtain an undelayed modulated intermediate signal;
means for combining the delayed modulated intermediate signal with the undelayed modulated intermediate signal;
means for determining the variation of phase between the delayed modulated intermediate signal and the undelayed modulated intermediate signal; and
means, responsive to said means for determining, for extracting the analog signal from the combined delayed and undelayed modulated intermediate signal.

8. The analog optical FM receiver of claim 7 in which said intermediate signals are electrical signals.

9. The analog optical FM receiver of claim 7 further including means for limiting the amplitude variations in the intermediate signals.

10. An analog optical FM receiver comprising:
photoelectric diode means for beating a modulated optical carrier signal with an optical reference signal to obtain a modulated intermediate signal;
a local oscillator laser for providing said optical reference signal whose frequency differs from that of the unmodulated optical carrier signal;
means for limiting amplitude variations in said modulated intermediate signal coupled to said local oscillator laser for maintaining said modulated intermediate signal over variations in said modulated optical carrier signal; and
a delay discriminator for delaying said modulated intermediate signal and combining said delayed modulated intermediate signal with the undelayed modulated intermediate signal to detect the variation in phase therebetween representative of the modulating signal.

* * * * *